United States Patent [19]

Henry, Jr. et al.

[11] 4,387,173

[45] Jun. 7, 1983

[54] USE OF RESORCINAL POLYMER BLEND AS A BINDER FOR CARBON-CONTAINING REFRACTORY BRICK AND SHAPE

[75] Inventors: Francis W. Henry, Jr., Glen Burnie; Merrill Wood, Jr., Baltimore; Ljubisa Rankovic, Glen Burnie, all of Md.

[73] Assignee: General Refractories Company, Bala Cynwyd, Pa.

[21] Appl. No.: 254,980

[22] Filed: Apr. 16, 1981

[51] Int. Cl.³ .......................... C08K 5/06; C08K 3/04
[52] U.S. Cl. ........................................ 524/63; 524/65;
524/356; 524/376; 524/377; 524/391; 524/424;
524/430; 524/442; 524/443; 524/444; 524/445;
524/611; 524/594; 523/139; 523/140; 523/145
[58] Field of Search .................. 523/140, 139, 145;
524/594, 611, 63, 65, 424, 443, 430, 445, 442,
444, 391, 377, 376; 528/219

[56] References Cited

U.S. PATENT DOCUMENTS 3,816,145  6/1974  Melcher ........................... 106/38.35

Primary Examiner—Lewis T. Jacobs
Attorney, Agent, or Firm—Brian G. Brunsvold; Everett H. Murray, Jr.; Charles E. Lipsey

[57] ABSTRACT

Compositions for forming carbon-containing refractory brick or shape comprising a refractory filler, a binder for said filler and a hardening agent for said binder, said binder comprising a mixture of polymers formed by the homopolymerization of resorcinol. Compositions for forming a carbon-containing refractory brick or shape as above described are also disclosed in which a basic refractory filler is employed and hardening agents are unnecessary. Methods of forming carbon-containing refractory brick or shape are also disclosed involving milling of a dry binder comprising a mixture of polymers formed by the homopolymerization of resorcinol with the refractory filler or mixture of a solution of such a binder material with the refractory filler, either of which may be conducted at ambient temperature.

20 Claims, No Drawings

USE OF RESORCINAL POLYMER BLEND AS A BINDER FOR CARBON-CONTAINING REFRACTORY BRICK AND SHAPE

BACKGROUND OF THE INVENTION

The invention relates generally to refractory compositions. More specifically, the invention relates to refractory compositions suitable for use in the formation of carbon-containing refractory brick or shape and methods of making such brick or shape.

In the past, refractory products have been produced as unformed compositions, such as ramming, casting, or gunning mixes, and as preshaped objects, such as brick and shapes. The standard rectangular brick, measuring 9" long, 4½" wide, and 2½ thick, is most often used to build straight walls. Tapered bricks which form self supporting arches, and tapered bricks with undercut slots on the exterior side from which the brick may be hung, may be used to form curved walls and roofs of a furnace. In addition to such bricks, special shapes have been designed such as corner blocks or edge blocks with curved interior faces, skew block, floor tile, muffle wall tile, and grid sections tile. Moreover, blocks of special shapes may be formed with various shapes and sizes of openings in the block for the insertion of burners and the like. Refractory shapes also include runners, gates, sleeves, nozzles, and troughs used to control the flow of molten material.

Brick and shapes have been formed by hand molding, mechanical pressing, or casting in pre-shaped molds, either as water-based slurries or in molten form. Refractory brick and shape have generally been formed from compositions containing a refractory filler with or without a carbonizable binding material. Coal tar pitch has previously been employed as such a binding material and continues to represent one of the most economical binding agents. However, in both brick and shape applications, coal-tar-bonded refractory compositions have been recognized as generating substantial quantities of noxious fumes during firing. These fumes pose air contamination and occupational health hazards and have been recognized as carcinogenic.

Efforts have been made in the past to replace the coal tar binding materials in refractory compositions. For example, U.S. Pat. No. 4,072,531 issued to Funabiki et al. discloses a blast furnace taphole plugging composition including, inter alia, a lignin-modified phenol-formaldehyde condensation product as a replacement for some or all of the tar binding material. In reference to prior art efforts to substitute conventional phenolic resins for the coal tar binder in similar compositions, Funabiki et al. notes that conventional phenolic resins are disadvantageously expensive.

U.S. Pat. No. 4,022,739, issued to Bove also discloses a binder for taphole plugging compositions which does not generate noxious fumes to the degree experienced with coal tar. The binder of Bove comprises a mixture of a high boiling hydrocarbon derivative and a synthetic resin, which may be a formo-phenolic resin having resorcinol molecules in the polymer chain. In this regard, the use of resorcinol-formaldehyde and phenol-formaldehyde polymers as temporary binders for refractory materials including brick is well known. U.S. Pat. No. 3,007,805, issued to Cline and U.S. Pat. No. 2,938,807, issued to Andersen both disclose the use of phenol-formaldehyde and resorcinol-formaldehyde resins as carbonizable binders for refractory bodies.

Use of phenol-formaldehyde and resorcinol-formaldehyde polymers as the binding material for refractory compositions does not entirely solve the fume problem. More specifically, these polymers commonly contain free formaldehyde. As noted in U.S. Pat. No. 3,917,558 issued to Gardikes et al., the formaldehyde vapors generated during curing are unpleasant, irritating, and pose a health hazard to persons continually exposed to such vapors. Moreover, these polymers may contain 5-10% free phenol, which may also vaporize during curing and thus generate toxic fumes. In addition, fumes from organic solvents employed with some prior art synthetic resin binders were hazardous to manufacturing employees.

SUMMARY OF THE INVENTION

The present invention overcomes many of the problems hitherto associated with the use of coal tar binders in carbon containing refractory brick or shape, as well as many of the problems associated with the use of conventional formo-phenolic resins as substitute binders in such materials. The present invention overcomes these problems by employing a binder comprising a mixture of polymers formed by the homopolymerization of resorcinol. More specifically, a composition for forming carbon-containing refractory brick or shape is provided comprising a refractory filler, a binder for the filler, and a hardening agent for the binder, the binder comprising the mixture of polymers formed by the homopolymerization of resorcinol as above described. Moreover, compositions are provided for forming a carbon-containing refractory brick or shape which comprise a basic refractory filler and a binder for the filler, the binder comprising a mixture of polymers formed by the homopolymerization of resorcinol. When basic refractory fillers are employed, the composition does not require an added hardening agent. The mixtures of polymers forming the binder in either of the above noted compositions are non-carcinogenic, do not produce noxious vapors to the extent experienced with coal tar, do not contain free formaldehyde, and contain less free monomeric phenolic material than many prior art synthetic resin binding materials.

The binders employed in accordance with the present invention are thermoplastic, having a softening temperature of about 80° C., and are also soluble in various solvents, including water, alcohols, ketones, and others. Accordingly, the compositions for forming carbon-containing refractory brick or shape in accordance with the present invention may either be made hot, by preheating the binder and the grain as is currently done with magnesite or magnesite-carbon type brick, or may be made cold, by dissolving the binder in a suitable solvent and adding the cut-back binder to the remainder of the brick composition. A major advantage of the binders employed in the present invention is that they may be processed at ambient temperature either as a particulate solid or as a solution and are non-carcinogenic.

Additional objects and advantages of the invention will be set forth in part in the description which follows, and in part will be obvious from the description, or may be learned from the practice of the invention. The objects and advantages of the invention may be realized and attained by means of the instrumentalities and combinations particularly pointed out in the appended claims.

To achieve the objects and in accordance with the purpose of the invention, as embodied and broadly described herein, a composition for forming a carbon-containing refractory brick or shape in accordance with the present invention comprises a refractory filler, a binder for the filler, and a hardening agent for the binder, the binder comprising a mixture of polymers formed by the homopolymerization of resorcinol. Alternatively, compositions for forming a carbon-containing refractory brick or shape in accordance with the present invention may comprise a basic refractory filler and a binder for the filler, the binder again comprising a mixture of polymers formed by the homopolymerization of resorcinol and above described, without the necessity of an added hardening agent for the binder.

The compositions provided in accordance with the present invention may be prepared and formed into carbon-containing refractory brick or shape by a method comprising (a) mixing at ambient temperature to a consistency suitable for forming (1) a refractory filler and (2) a solution of binder for the filler, the binder comprising a mixture of polymers formed by homopolymerization of resorcinol; (b) pressing the mixture or the filler and the solution into the form of a refractory brick or shape; and (c) curing the shaped mixture at a temperature of ambient temperature to 300° C. for a time sufficient to remove any solvents and any mechanical water.

The compositions provided in accordance with the present invention may also be prepared and formed into carbon-containing refractory brick and shape by a method comprising (a) milling at ambient temperature a solid binder material, the binder comprising a mixture of polymers formed by the homopolymerization of resorcinol; (b) preparing a mixture of refractory filler and a suitable wetting agent; (c) mixing at ambient temperature to a consistency suitable for forming (1) the milled polymer and (2) the wet filler mixture; (d) pressing the mixture of the filler and the binder into the form of a refractory brick or shape; and (e) curing the shaped mixture at a temperature of ambient temperature to 300° C. for a time sufficient to remove any solvents and any mechanical water.

Solvents for the binders and wetting agents for the fillers employed in accordance with the present invention may be selected from the group consisting of water, alcohols, ketones, cellosolve, cellosolve acetate, ethylene glycol, polyethelene glycol, isopropyl alcohol, or mixtures thereof.

When a hardening agent is employed with the compositions of the present invention, it may be selected from the group consisting of lignosulphonate, sulphur, tris-( hydroxymethyl)-nitromethane, hexamethylene tetramine, hexamethoxymethylmelamine, urea-formaldehyde concentrates, para-formaldehyde, or other methylene donors.

Typically, the mixture of polymers formed by the homopolymerization of resorcinol forming the binder for the compositions in accordance with the present invention will comprise up to about 20% resorcinol, about 5–30% isomers of dihydroxydiphenyl, about 10–45% isomers of trihydroxydiphenyl, and the balance being higher polymers of resorcinol. The binder is typically present in compositions in accordance with the present invention in amounts of from about 3 to about 12 parts by weight per 100 parts of refractory filler.

DESCRIPTION OF THE PREFERRED EMBODIMENTS

Reference will now be made in detail to the presently preferred embodiments of the invention, which, together with the following examples, serve to explain the principles of the invention. As above noted, a composition for forming a carbon-containing refractory brick or shape in accordance with the present invention may comprise a refractory filler, a binder for the filler, and a hardening agent for the binder, the binder comprising a mixture of polymers formed by the homopolymerization of resorcinol. Moreover, compositions for forming a carbon-containing refractory brick or shape in accordance with the present invention may comprise a basic refractory filler and a binder comprising a mixture of polymers formed by the homopolymerization of resorcinol without the need for added hardening agents.

The polymeric resorcinol materials useful in accordance with the present invention may be formed by heating monomeric resorcinol to temperatures above about 200° C. For example, suitable polymeric resorcinol materials are formed as a solid resinous still residue remaining after the distillation of technical grade resorcinol. Residues of this type are described in detail in U.S. Pat. No. 3,816,145 issued to Melcher, as well as in U.S. Pat. No. 3,133,033 issued to St. Clair, and U.S. Pat. No. 3,347,884 issued to Voris.

Preferred polymeric resorcinol binding materials useful in accordance with the present invention comprise up to about 20% resorcinol, about 5–30% isomers of dihydroxydiphenyl, about 10–45% isomers of trihydroxydiphenyl, and the balance being higher polymers of resorcinol. Particularly preferred polymeric resorcinol materials useful as binders in accordance with the present invention comprise about 2–8% resorcinol, about 11–20% isomers of dihydroxydiphenyl, about 10–45% isomers of trihydroxydiphenyl, and the balance being higher polymers of resorcinol. A composition corresponding to this particularly preferred material is commercially available from Koppers Company, Inc., Pittsburgh, Pa., under the trade designation "Penacolite Resin RM-441." These particularly preferred materials have a lower percentage of free monomeric resorcinol constituents than conventional phenolic resins, the latter having typically 5–10% free phenol compared with 2–8% free resorcinol in the former. Even in like concentrations, resorcinol monomer is much less toxic than phenol monomer. The reduction in monomeric constituents, and the elimination of phenol, are particularly advantageous in reducing the amount of toxic vapor given off during use of the compositions of the present invention.

The binder is typically a thermoplastic material, solid at room temperature, with a softening temperature of about 80° C. The more reactive portion of the polymer is monomeric resorcinol and isomers of dihydroxydiphenyl and trihydroxydiphenyl.

The hardening agents employed with the binders for the carbon-containing refractory brick or shape compositions of the present invention may include lignosulphonate; sulphur; nitroalcohols, such as tris-(hydroxymethyl)-nitromethane; amines, such as hexamethylene tetramine and hexamethoxymethylmelamine; urea-formaldehyde concentrates; para-formaldehyde; or other methylene donors. Preferred hardening agents for use in accordance with the present invention are selected from the group consisting of lignosulphonate, sulphur, tris-(hydroxymethyl)-nitromethane, hexamethylene tetramine, hexamethoxymethylmelamine, urea-formaldehyde concentrates, para-formaldehyde, or other methylene donors.

Nitroalcohols, such as tris-(hydroxymethyl)-nitromethane, are particularly preferred because of their high decomposition temperature and the marked plasticizing effect they have on the mixture at temperatures below that decomposition temperature. Tris-(hydroxymethyl)-nitromethane, for example, decomposes at about 175° C. to provide methylene for hardening the polymer yet can plasticize the mix at lower temperatures.

Unlike prior art materials containing formo-phenolic binding materials, the compositions of the present invention do not contain large quantities of free formaldehyde and, therefore, avoid the health hazards hitherto experienced with the generation of formaldehyde vapors in prior art materials. Most significantly, however, the binding materials of the present invention are non-carcinogenic and provide a distinct improvement over coal tar binders of the prior art in this regard. Further, the polymeric resorcinol binding materials of the present invention are significantly less expensive than conventional formo-phenolic resins employed as a substitute for coal tar in the prior art.

Solvents and wetting agents in the compositions and methods of the present invention may be any of those previously employed in the prior art or otherwise known to be suitable for the polymeric resorcinol binders of the present invention. Preferred solvents are selected from the group consisting of water, cellosolve, cellosolve acetate, ethylene glycol, isopropyl alcohol, polyethylene glycol, or mixtures thereof. Also suitable for use in the present invention are other alcoholic solvents or ketone solvents.

When a hardening agent for the binder is employed, the refractory filler materials employed in the compositions of the present invention can be any of those normally employed for such purposes in the prior art. These materials include, but are not limited to, high density siliceous sand, chamotte, corundum, magnesia, dolomite, silicon carbide, bauxite, mullite, sillimanite, soft coal, hard coal, coke dust, graphite, coke breeze, calcined fireclay, pyrophyllite, ball clay, ferrosilicon, aluminisilicates, mixtures thereof, etc.

It has been discovered that no hardening agent is needed when the composition for forming carbon-containing refractory brick or shape in accordance with the present invention comprises a basic refractory filler and a binder for said filler, the binder comprising a mixture of polymers formed by the homopolymerization of resorcinol as above described. More specifically, without being bound to a particular theory of reaction, it would appear that basic brick fillers catalyze reactions in the mixture of polymers formed by the homopolymerization of resorcinol to increase the average molecular weight of the polymer.

The basic refractory filler appears to promote the reaction within the mixture of polymers at reduced temperatures, such that fusing of the binder material is not a problem. In this regard, compositions for forming a carbon-containing refractory brick or shape comprising a basic refractory filler and a binder comprising a mixture of polymers formed by the homopolymerization of resorcinol have excellent strength at elevated temperature.

More specifically, the reaction at reduced temperature appears to be catalyzed or promoted by sodium hydroxide and other basic metals. For example, in acid conditions (such as in the presence of silicon carbide), one would expect a condensation reaction to occur in the mixture of polymers of resorcinol forming the binder of the present invention at about 500°–1000° F. However, in the presence of basic refractory filler materials, the condensation reaction appears to occur at lower temperatures, such as 200° F.

Basic refractory filler material suitable for use in this embodiment of the invention may be selected from the group consisting of magnesite, magnesia, periclase, dolomite, chrome ore, and comparable mixtures thereof.

The compositions for forming carbon-containing refractory brick or shape in accordance with the present invention will provide a non-carcinogenic binder which is economically equivalent to coal tar pitch but which avoids the many disadvantages attending the use of coal tar pitch described above. Moreover, there is a somewhat reduced breakage rate for brick and shape formed using the compositions of the present invention in comparison with those formed using coal tar pitch.

Use of the compositions of the present invention also provides certain processing advantages in that the compositions may be prepared and formed into brick by either a hot or a cold process and using a binder in either solid or solution form. This flexibility flows from the fact that the binder material is thermoplastic having a softening temperature of about 80°–90° C. as well as being soluble in a variety of solvents. A particular advantage of the compositions in accordance with the present invention is that they may employ an aqueous solvent. Use of an aqueous solvent eliminates noxious or toxic vapors and fire or explosion threats attendant upon the use of many organic solvents hitherto employed in brick applications.

A particularly preferred binder may be a 65% solids (by weight) solution of the mixture of resorcinol polymers in water. It is to be understood, however, that binders for carbon-containing refractory brick compositions in accordance with the present invention may also be in alcoholic or ketone solution.

One method of making carbon-containing refractory brick or shape in accordance with the present invention comprises (a) mixing at ambient temperature to a consistency suitable for forming (1) a refractory filler and (2) a solution of binder for said filler, said binder comprising a mixture of polymers formed by the homopolymerization of resorcinol as above described; (b) pressing the mixture of said filler and said solution into the form of a refractory brick or shape; and (c) curing the shaped mixture at a temperature of ambient temperature to 300° C. for a time sufficient to remove any solvents and any mechanical water.

Another method for making carbon-containing refractory brick or shape in accordance with the present invention comprises (a) milling at ambient temperature a solid binder material, the binder comprising a mixture of polymers formed by the homopolymerization of resorcinol as above described; (b) preparing a mixture of a refractory filler and a suitable wetting agent; (c) mixing at ambient temperature to a consistency suitable for forming (1) the milled polymer and (2) the wet filler mixture; (d) pressing the mixture of the filler and the binder into the form of a refractory brick or shape; and (e) curing the shaped mixture at a temperature of ambient temperature to 300° C. for a time sufficient to remove any solvents and any mechanical water.

In either process, a hardening agent for the binder, as above described, may be included in the mixture prior to forming the mixture into the form of a refractory brick or shape. The solvents and wetting agents employed in these processes may be any of those previously listed. Preferably, the binder is a 65% solids aqueous solution.

The best embodiment presently envisioned by the inventors for practicing the present invention consists of the use of a 65% solids aqueous solution of the mixture of resorcinol polymers as the binder, with or without hardeners (e.g., hexamethylene tetramine, tris-(hydroxymethyl)-nitromethane (or any suitable methylene donor), sulphur, lignosulphonate, etc.). The binder solution may be mixed at ambient temperatures with the refractory grain and pressed into appropriate shapes. Curing may be accomplished from ambient temperature to about 300° C. for at least eight hours (sufficient time being allowed to remove mechanical water).

The solid polymer blend may be used in the same manner as is currently used in pitch bonded type brick with the addition that the material may be milled at ambient temperature, with or without the fine portion of the brick composition, and therewith added to the mix. The preferred mixing procedure for using the milled or co-milled solid polymer blend is to (1) add coarses, (2) wet coarses with appropriate wetting agent (e.g., water, alcohols, cellosolve, cellosolve acetate, ketones, etc.); (3) add fines and polymer blend; and (4) mix to a consistency suitable for forming. The mixture may then be formed into an appropriate shape and cured as above described.

Other techniques not utilizing sequential mixing are also acceptable. When used, the hardeners are added in amounts from 0 to about 30% by weight on a resin basis. The resin binder is typically present in amounts of from 3-12, more specifically 5-12, parts by weight per 100 parts of refractory filler.

The compositions and processes of the present invention are applicable but not limited to magnesite brick, magnesite-carbon brick, high alumina brick with or without silicon carbide and carbon, and silicon carbide brick with or without carbon. A preferred range of hardener concentrations, when hardeners are employed, is 5-15% by weight on a resin basis. The amount of cutback resin necessary for use with a brick composition in accordance with the present invention would vary from 3-12% by weight. It is to be understood, however, that the selection of suitable proportions of materials for application of the teachings of the present invention to a specific problem or environment will be within the capabilities of one having ordinary skill in the art in light of the teachings contained herein.

An example of a composition within the scope of the present invention and its properties is given in Table I. It can be observed from this Table that physical properties comparable to pitch-bonded brick can be obtained with the non-carcinogenic compositions of the present invention.

TABLE I

|  | Comp. I | Comp. II |
|---|---|---|
| Dead Burned MgO 96% | | |
| Coarse Coarses | 42.5 | 42.5 |
| Fine Coarse | 35.0 | 35.0 |
| Intermediates | 6.5 | 6.5 |
| Ball Mill Fines | 16.0 | 16.0 |
| Added (%) | | |
| Carbon Black | 2.3 | 2.8 |
| Graphite Fines | 4.7 | 5.5 |
| Hardening agent (sulfur) | 0.2 | 0.2 |
| Wetting agent | 0.02 | 0.02 |
| Pitch (90° C. C/A) | 5.8 | — |
| Resorcinol Polymer Blend | — | 5.4 |
| (Penacolite Resin RM-441) | | |
| Properties | | |
| Off-Press Density, g/cm$^3$ | 3.04 | 3.16 |
| After Curing | | |
| Density, g/cm$^3$ | 3.01 | 3.06 |
| Open Porosity, % | 3.2 | 3.8 |
| Crushing Strength at 300° F., psi | 2,600 | 4,450 |
| Modulus of Rupture at 950° F., psi | 535 | 875 |
| Crushing Strength (cold), psi | 3,026 | 5,410 |
| Modulus of Rupture (cold), psi | 1,015 | 1,480 |
| After Coking | | |
| Density, g/cm$^3$ | 2.92 | 2.96 |
| Open Porosity, % | 10.1 | 9.8 |
| Crushing Strength, psi | 3,150 | 4,560 |
| Modulus of Rupture, psi | 390 | 495 |
| Apparent Residual Carbon, % | 9.10 | 9.35 |
| After Ignition | | |
| Density, g/cm$^3$ | 2.70 | 2.74 |
| Open Porosity, % | 22.85 | 21.40 |
| Loss on Ignition, % | 10.41 | 10.91 |
| Slag Erosion, % | 31.33 | 25.29 |

Trials have also been conducted with BOF type brick. Table II below gives examples of resorcinol polymer bonded brick, with or without the hardener, comparing such brick with pitch and phenol-formaldehyde bonded brick.

TABLE II

| Comparative Physical Properties of Converter Brick With Various Carbonaceous Binders | | | | | |
|---|---|---|---|---|---|
| Composition, Weight Percent | I | II | III | IV | V |
| Sintered MgO Grain 95% MgO | | | | | |
| Sized appropriately for BOF | | | | | |
| Type Brick | 100 | 100 | 100 | 100 | 100 |
| Additives: | | | | | |
| Carbon Black | 2.5 | 2.5 | 2.5 | 2.5 | 2.5 |
| Pitch | 3.3 | — | — | — | — |
| Resorcinol Polymer Blend | — | 3.3 | 3.3 | — | — |
| (Penacolite Resin RM-441) | | | | | |
| Phenol Formaldehyde Resin | — | — | — | 3.3 | 3.3 |
| Hardener (based on resin) | — | — | (8.0) | — | (15.0) |
| Properties: | | | | | |
| Bulk Density, Mg/m$^3$ | 3.11 | 3.13 | 3.13 | 3.13 | 3.13 |
| lb/ft$^3$ | 194.4 | 195.5 | 195.5 | 195.5 | 195.5 |
| After Tempering | | | | | |
| Bulk Density, Mg/m$^3$ | 3.06 | 3.09 | 3.09 | 3.05 | 3.05 |
| lb/ft$^3$ | 191.2 | 193.4 | 193.4 | 190.1 | 190.1 |
| Open Porosity, % | 3.8 | 3.8 | 3.4 | 6.8 | 6.2 |
| Bulk Specific Gravity | 3.04 | 3.02 | 3.03 | 3.03 | 3.05 |

TABLE II-continued

Comparative Physical Properties of Converter Brick With Various Carbonaceous Binders

| Composition, Weight Percent | I | II | III | IV | V |
|---|---|---|---|---|---|
| Crushing Strength @ 300° F., | | | | | |
| psi | 540 | 5350 | 6380 | 6630 | 5830 |
| MPa | 3.7 | 36.8 | 43.9 | 45.6 | 40.1 |
| MOR @ 950° F., psi | 120 | 1020 | 1340 | 460 | 450 |
| MPa | 0.6 | 7.0 | 9.2 | 3.1 | 3.1 |
| After Coking | | | | | |
| Bulk Density, $Mg/m^3$ | 2.98 | 3.02 | 3.02 | 3.00 | 3.00 |
| $lb/ft^3$ | 186.3 | 188.5 | 188.5 | 186.8 | 186.8 |
| Open Porosity, % | 10.1 | 10.3 | 9.8 | 11.0 | 10.2 |
| Apparent Specific Gravity | 3.34 | 3.36 | 3.36 | 3.35 | 3.35 |
| CMOR, psi | 645 | 905 | 1170 | 590 | 430 |
| MPa | 4.4 | 6.2 | 7.7 | 4.0 | 2.9 |
| Cold Crushing Strength, | | | | | |
| psi | 2970 | 2050 | 2430 | 2170 | 2210 |
| MPa | 20.5 | 14.1 | 10.7 | 14.9 | 15.2 |
| Apparent Retained Carbon | 4.87 | 4.76 | 4.87 | 3.08 | 2.80 |
| After Ignition | | | | | |
| Bulk Density, $Mg/m^3$ | 2.91 | 2.96 | 2.96 | 2.94 | 2.94 |
| $lb/ft^3$ | 181.7 | 184.8 | 184.8 | 182.5 | 183.2 |
| Open Porosity, % | 17.2 | 15.9 | 16.1 | 17.8 | 17.9 |
| LOI, % | 6.21 | 6.18 | 6.25 | 4.87 | 4.51 |
| Rotary Slag Area Erosion, % | 13.31 | 7.24 | 7.20 | 14.77 | 17.8 |

It will be apparent to those skilled in the art that various modifications and variations can be made in the compositions for forming carbon-containing refractory brick or shape, and methods of making and using them, in accordance with the present invention. Thus, it is inteded that the present invention cover the modifications and variations of this invention provided that they come within the scope of the appended claims and their equivalents.

What is claimed is:

1. A composition for forming a carbon-containing refractory brick or shape comprising a refractory filler, a binder for said filler, and a hardening agent for said binder, said binder comprising a mixture of polymers formed by the homopolymerization of resorcinol.

2. A composition for forming a carbon-containing refractory brick or shape comprising a basic refractory filler and a binder for said filler, said binder comprising a mixture of polymers formed by the homopolymerization of resorcinol, said filler being selected from the group consisting of magnesite, magnesia, periclase, dolomite, chrome ore, and mixture thereof.

3. A composition according to claim 1 in the form of a carbon-containing refractory brick or shape.

4. A composition according to claim 2 in the form of a carbon-containing refractory brick or shape.

5. A composition according to claims 1, 2, 3, or 4 wherein said mixture of polymers formed by the homopolymerization of resorcinol comprises up to about 20% resorcinol, about 5-30% isomers of dihydroxydiphenyl, about 10-45% isomers trihydroxydiphenyl, and the balance being higher polymers of resorcinol.

6. A composition according to claims 1, 2, 3, or 4 wherein said mixture of polymers formed by the homopolymerization of resorcinol comprises about 2-8% resorcinol, about 12-20% isomers of dihydroxydiphenyl, about 10-45% isomers of trihydroxydiphenyl, and the balance being higher polymers of resorcinol.

7. A composition acording to claims 1, 2, 3 or 4 wherein said binder is non-carcinogenic.

8. A composition according to claims 1, 2, 3, or 4 wherein said binder is thermoplastic and has a softening temperature of about 80° C.

9. A composition according to claims 1 or 3 wherein said hardening agent is selected from the group consisting of lignosulphonate, sulphur, tris-(hydroxymethyl)-nitromethane, hexamethylene tetramine, hexamethoxymethylmelamine, urea-formaldehyde concentrates, para-formaldehyde, or other methylene donors.

10. A composition according to claims 1 or 2 additionally including a solvent for said binder.

11. A composition according to claim 10, wherein said solvent is selected from the group consisting of alcohols, ketones, and mixtures thereof.

12. A composition according to claim 11, wherein said solvent is present in amounts sufficient to give the composition a consistency suitable for forming.

13. A composition according to claim 10 wherein said solvent is selected from the group consisting of water, cellosolve, cellosolve acetate, ethylene glycol, polyethelene glycol, isopropyl alcohol, or mixtures thereof.

14. A composition according to claims 1, 2, 3, or 4 wherein said binder is present in amounts of from 3-12 parts by weight per 100 parts of refractory filler.

15. A composition according to claim 14 wherein said binder is present in amounts of from 5 to 12 parts by weight per 100 parts of refractory filler.

16. A composition according to claim 9 wherein said hardening agent is present in amounts up to 30% by weight on a resin basis.

17. A composition according to claim 13 wherein said solvent is present in amounts sufficient to give the composition a consistency suitable for forming.

18. A composition according to claims 1 or 3 wherein said refractory filler is selected from the group consisting of high density siliceous sand, chamotte, corundum, magnesia, dolomite, silicon carbide, bauxite, mullite, sillimanite, soft coal, hard coal, coke dust, graphite, coke breeze, carbon black, calcined fireclay, pyrophyllite, ball clay, ferrosilicon, aluminosilicates, or mixtures thereof.

19. A composition according to claim 2 or 4 wherein said filler also contains a carbonaceous material selected from the group consisting of soft coal, hard coal, coke dust, graphite, coke breeze, carbon black, and mixtures thereof.

20. A composition according to claim 1 or 3, wherein said mixture of polymers formed by the homopolymerization of resorcinol comprises about 2–8% resorcinol, about 12–20% isomers of dihydroxydiphenyl, about 10–45% isomers of trihydroxydiphenyl, and the balance being higher polymers of resorcinol, said hardening agent consisting essentially of sulphur, and said filler being selected from the group consisting of magnesite, dolomite, and mixtures thereof.

* * * * *